United States Patent [19]
Pierzchalski et al.

[11] Patent Number: 5,524,558
[45] Date of Patent: Jun. 11, 1996

[54] STRAIGHT ROW SEED PLANTER

[76] Inventors: Ernest F. Pierzchalski, 20 Versailles Rd., Bull Shoals, Ark. 72619; Steven E. Pierzchalski, 2135 E. 175th St., #2, Lansing, Ill. 60438

[21] Appl. No.: 309,721

[22] Filed: Sep. 21, 1994

[51] Int. Cl.[6] ................................ A01C 7/00
[52] U.S. Cl. .................. 111/170; 111/92; 111/177; 239/156; 222/614
[58] Field of Search ..................... 111/170, 177, 111/90, 92, 95, 96; 239/650, 754, 156; 222/613, 614

[56] References Cited

U.S. PATENT DOCUMENTS

| | | | |
|---|---|---|---|
| 564,550 | 7/1896 | Benham | 222/614 |
| 765,968 | 7/1904 | Gibbs | 222/614 |
| 977,886 | 12/1910 | Lawrence | 111/170 X |
| 2,180,253 | 11/1939 | Moore | 239/650 |
| 2,350,107 | 5/1944 | Gandrud | 239/650 |
| 2,415,577 | 2/1947 | Bushue | 111/170 |
| 2,565,143 | 8/1951 | McKinley | 222/614 |
| 2,713,442 | 7/1955 | McFarling et al. | 111/177 X |
| 4,029,237 | 6/1977 | Miconi | 222/614 |
| 4,300,461 | 11/1981 | Hodge et al. | 111/6 |
| 4,930,431 | 6/1990 | Alexander | 111/170 X |

OTHER PUBLICATIONS

PDI–M15565M John Deere LF Fertilizer Distributor Brochure, Aug. 1961 pp. 8 & 9.

*Primary Examiner*—Terry Lee Melius
*Assistant Examiner*—Victor Batson

[57] ABSTRACT

A straight row seed planter wherein a support frame mounts a hopper onto a support beam, with an axle rotatably mounted within the support frame parallel to the support beam, wherein the support beam includes at least one pair of feed cones extending therefrom, with each feed cone having a closure door plate, and each closure door plate arranged for sequential operation by a respective cam member that effects sequential opening of each respective door plate to effect sequential feeding from the respective feed cones. The hopper is arranged for selective securement to the support frame to accommodate various quantities and sizing of seed to be planted.

3 Claims, 4 Drawing Sheets

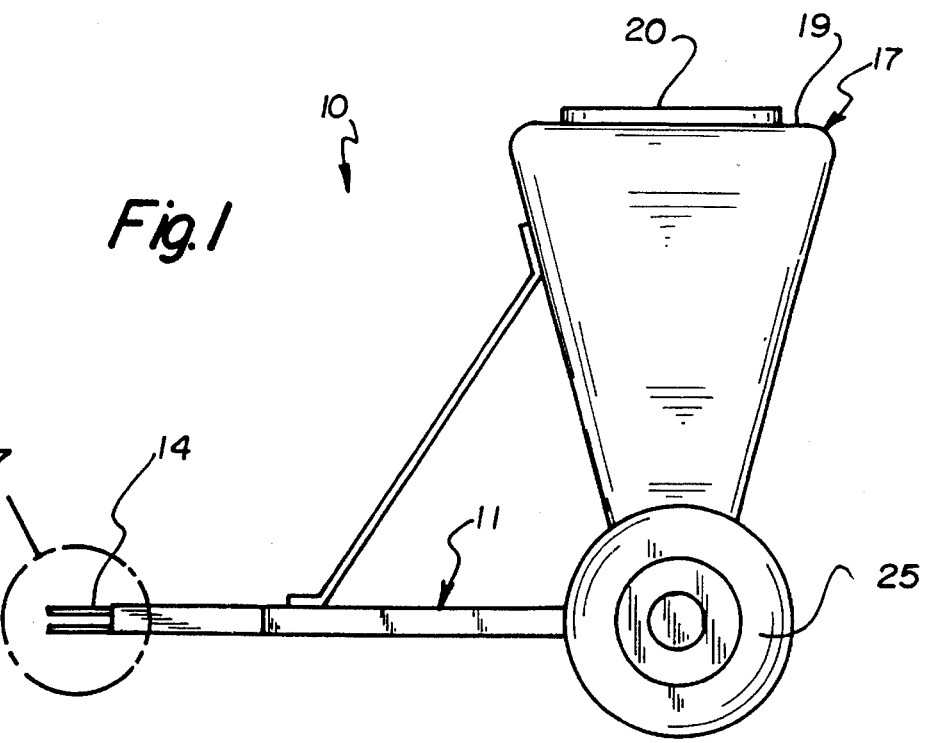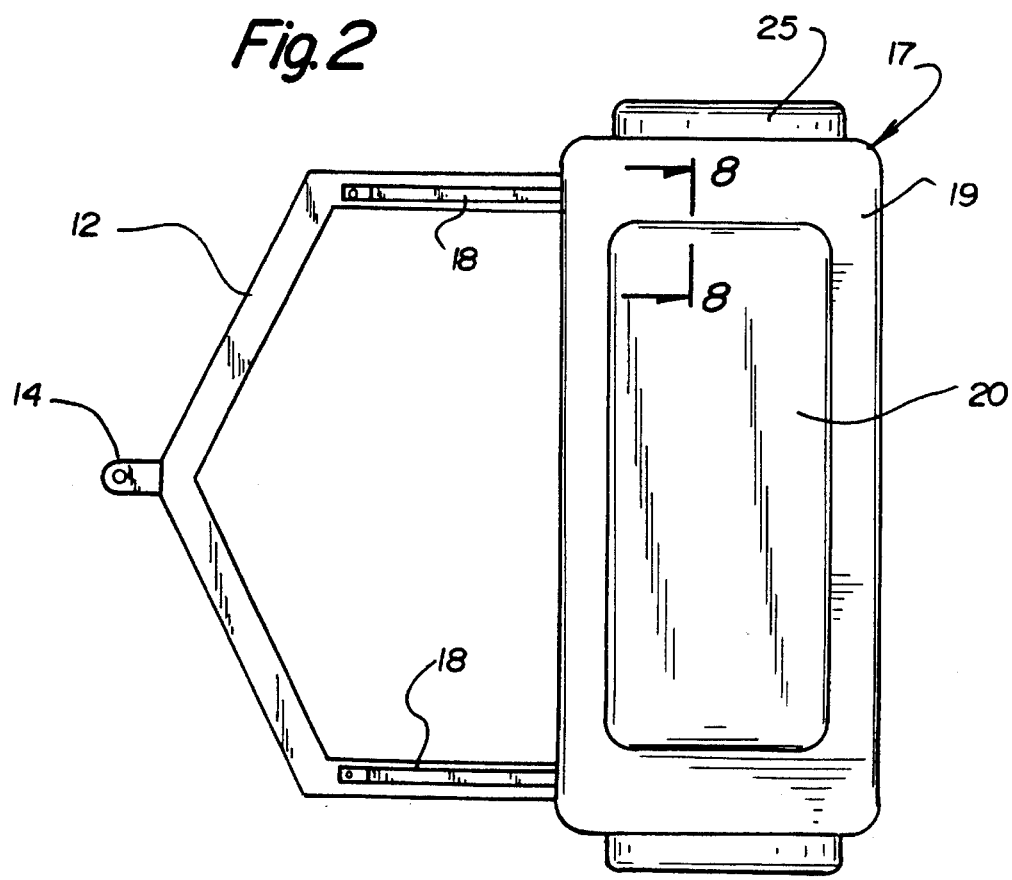

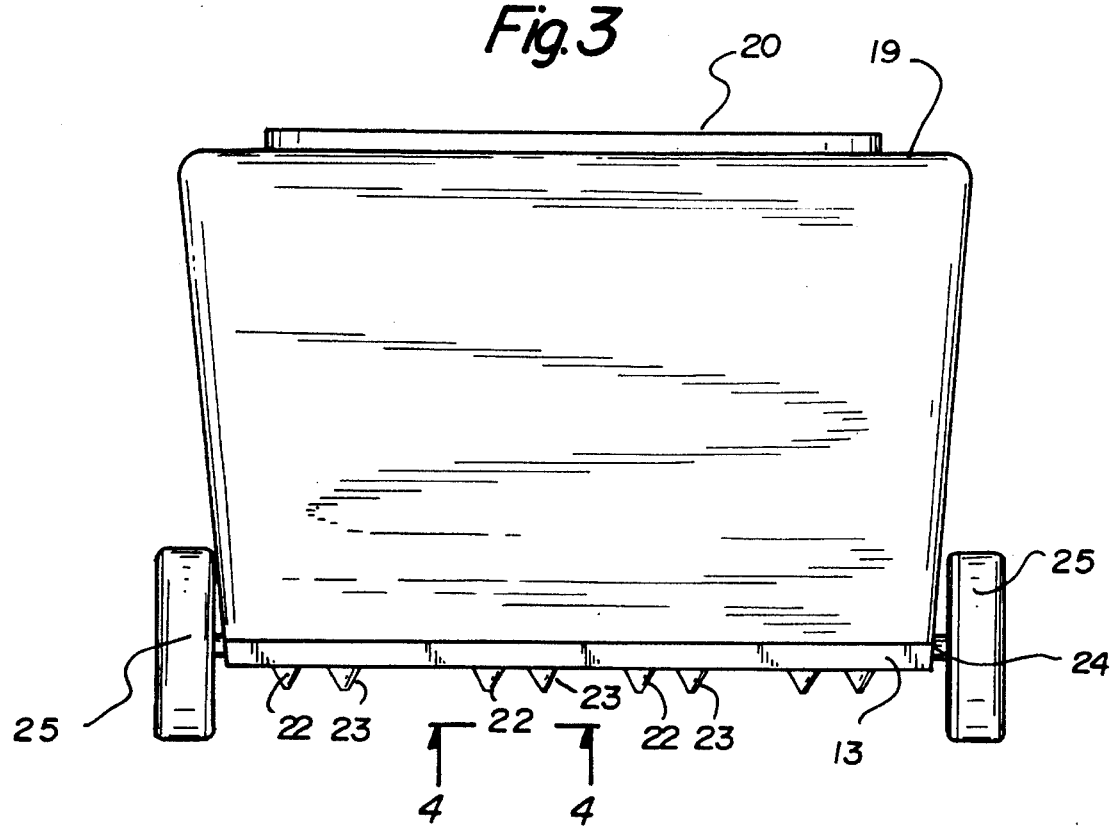
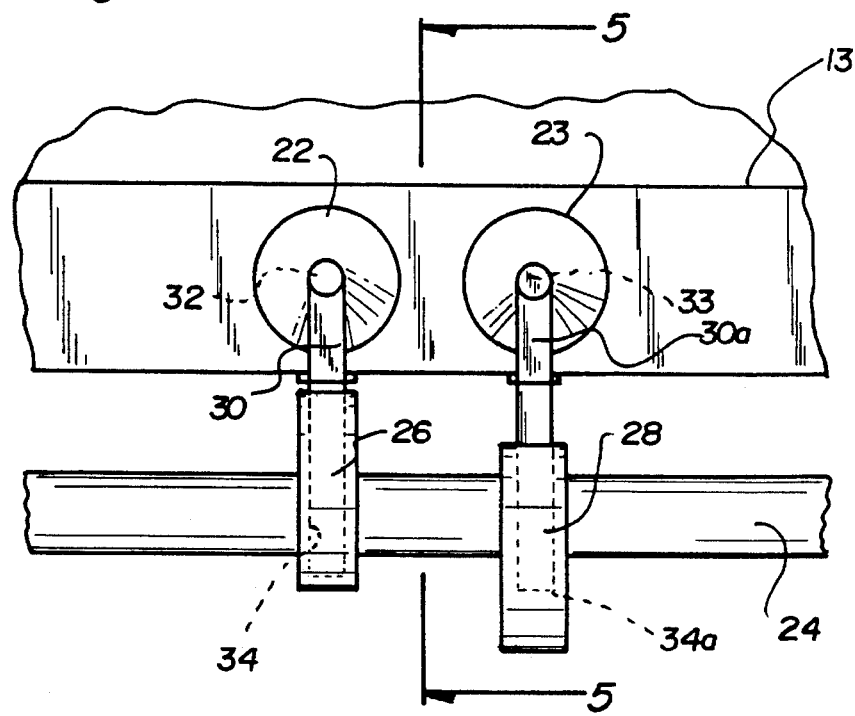

STRAIGHT ROW SEED PLANTER

TECHNICAL FIELD

The field of invention relates to seed planting apparatus, and more particularly pertains to a new and improved straight row seed planter wherein the same is arranged to effect the timed dropping of seeds from a hopper to enhance seed planting density.

BACKGROUND OF THE INVENTION

Seed planting structure is available in the prior art and exemplified by the U.S. Pat. Nos. 5,074,227; 5,255,618; 5,158,411; and 4,300,461.

The instant invention directs a seed planting structure wherein the same is arranged to enhance seed planting density advantageously over the prior art and the present invention substantially fulfills this need.

SUMMARY OF THE INVENTION

The present invention relates to a straight row seed planter wherein the same employs offset cam members to sequentially effect operation or individual feed cones of pairs of feed cones to thereby permit the loading of one of the feed cones while the other said seed cones are operated to effect the enhanced density in the planting of seeds.

Objects and advantages of this invention will become apparent from the following description taken in conjunction with the accompanying drawings which illustrate embodiments of this invention.

The drawings constitute a part of this specification and include exemplary embodiments of the present invention and illustrate various objects and features thereof.

BRIEF DESCRIPTION OF THE DRAWINGS

FIG. 1 is an orthographic side view of the invention.

FIG. 2 is an orthographic top view of the invention.

FIG. 3 is an orthographic rear view of the invention.

FIG. 4 is an enlarged orthographic view, taken along the lines 4—4 of FIG. 3 in the direction indicated by the arrows.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. therefore, specific structural and functional details disclosed herein are not to be interpreted as limiting, but merely as a basis for the claims and as a representative basis for teaching one skilled in the art to variously employ the present invention in virtually any appropriately detailed structure.

Figure 7:
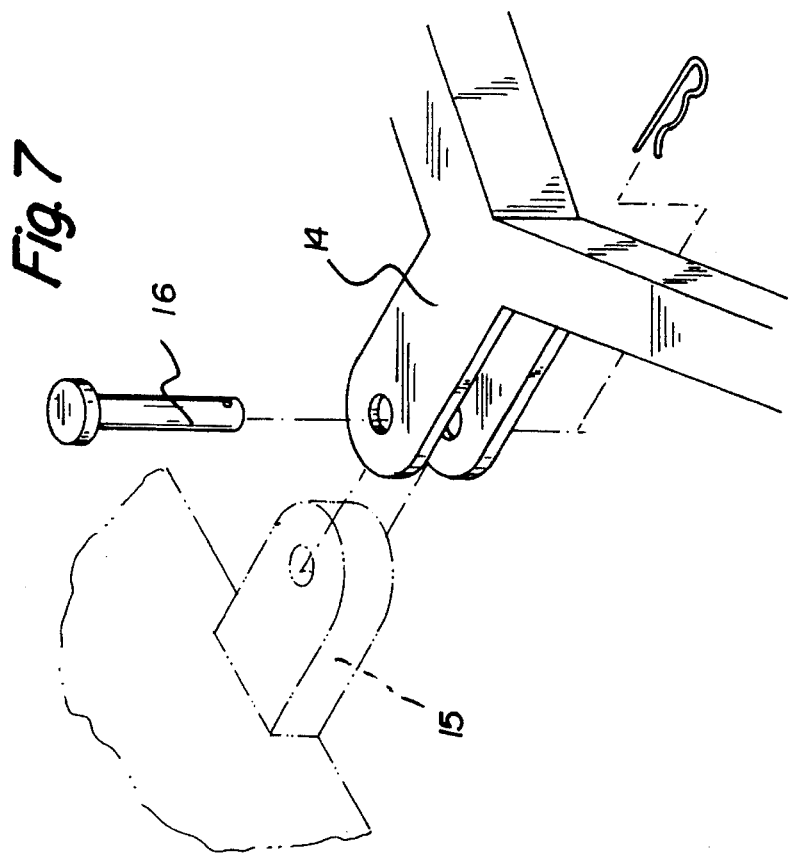
FIG. 7 is an enlarged isometric illustration of section 7 as set forth in FIG. 1.

The straight row seed planter 10 of the invention includes a rigid support frame 11, having a forward yoke 12 arranged for its securement to a tow vehicle such as indicated in FIG. 7, and more specifically to a tow flange 15 for example, such that a forward yoke of the support frame 11 includes a coupler 14 at its forwardmost distal end, such that the coupler receives the tow flange 15 and a lock pin 18 directed through the two flanges and the coupler 15 and 14 respectively. Operative securement to a tow vehicle is provided. The support frame 11 further employs a support beam 13 spanning the support frame, such that the support beam 13 is positioned in parallel adjacency to an axle 24 mounted to the support frame 11 in a rotatable manner.

A hopper 17 is arranged for selective securement onto the support frame 11 typically employing a removable relationship relative to the support frame to permit hoppers of various sizes to be positioned upon the support frame, such that support braces 18 extend from the hopper and are bolted onto the forward yoke 12, as illustrated in FIG. 2. The hopper 17 includes a top wall 19 having a removable lid 20 to permit various seeds to be positioned within the hopper 17 and subsequently enclosed therewithin.

Figure 5:
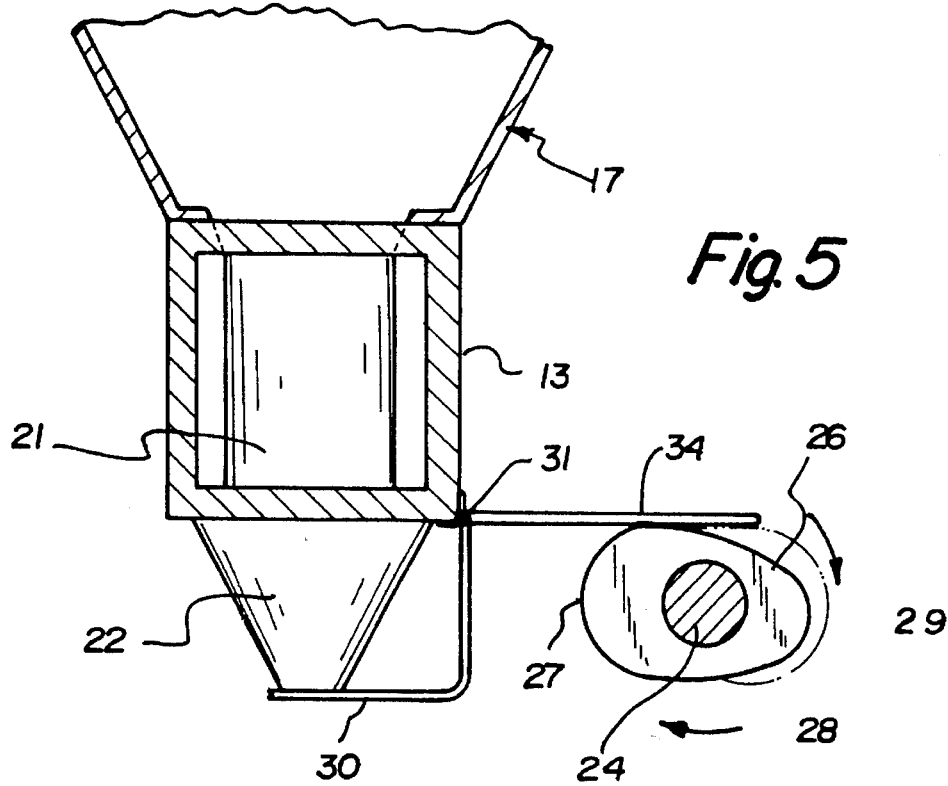
FIG. 5 is an orthographic view, taken along the lines 5—5 of FIG. 4 in the direction indicated by the arrows.
Figure 6:
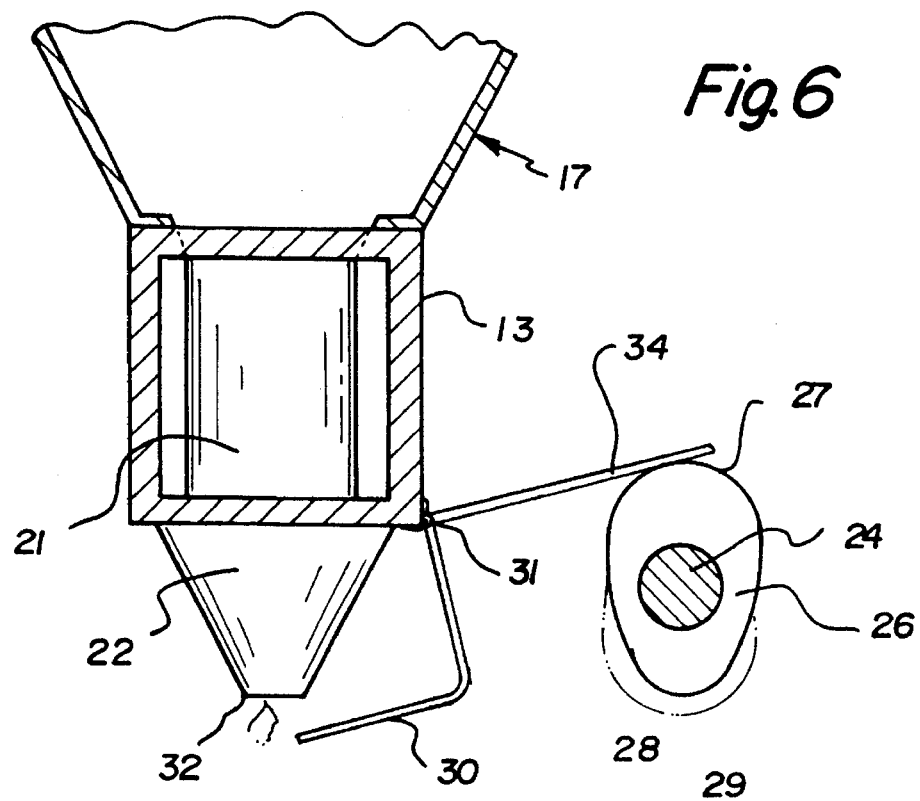
FIG. 6 is an orthographic view such as presented in FIG. 5, wherein a feed cone is indicated in an operative orientation relative to an associated door plate.
Figure 8:
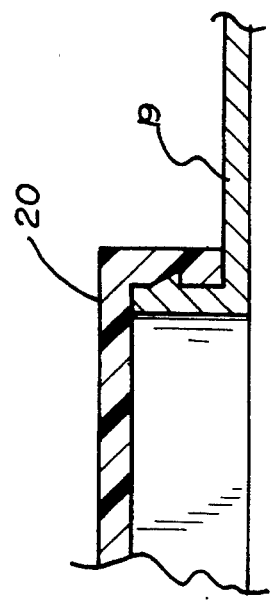
FIG. 8 is an enlarged orthographic cross-sectional illustration, taken along the lines 8—8 of FIG. 2 in the direction indicated by the arrows.

The FIGS. 5 and 6 indicates the hopper mounted onto the support beam 13, such that onto the support beam's bottom wall are a plurality of pairs of feed cones comprising first and second respective feed cones 22 and 23 relative to each pair of said feed cones. Each feed cone includes a deposit shoot 21 in communication with the hopper 17 to direct seed into each respective feed cone. As noted heretofore, the axle 24 is provided parallel and spaced relative to the support beam 13, such that wheel members 25 are fixedly mounted to the axle 24 exteriorly of the support frame 11, such that rotation of the wheel members 25 effects rotation of the axle 24.

The axle 24 includes pairs of cam members comprising first and second cams 26 and 28 respectively, with the first cam 26 arranged for operative association with the first feed cone 22, while the second cam 28 is arranged for operative communication with the second feed cone 23 through respective first and second door plates 30 and 30a, such as illustrated in FIG. 4. Each of the first and second door plates 30 and 30a is mounted to the support beam by a spring hinge 31, with the first and second door plates 30 and 30a overlying each respective exit opening of the feed cones, such as the first door plate 30 overlying the first feed cone exit opening 32, with the second door plate 30a overlying the second feed cone exit opening 33. In the first position, the door plates are in contiguous communication with the exit openings to prevent seed from passing, with the respective first and second cams 26 and 28 arranged to engage a respective door plate actuator lever 34 of each respective door plate. As illustrated in FIG. 5, as the first cam 26 is provided with a first cam lobe 27 and the second cam 28 is provided with a second cam lobe 29, engagement of a cam lobe with a respective door plate actuator lever 34 allows the respective door plate to be engaged permitting a seed to be deposited from a respective feed cone. The first and second cam lobes 27 and 29 of the respective first and second cams 26 and 28 are displaced relative to one another and as the first and second cams are fixedly secured to the axle, the first and second cams 26 and 28 operate the first and second door plates 30 and 30a sequentially. This permits the respective first and second feed cones to be emptied sequentially. For example as the first feed cone has its first door plate displaced relative to its respective exit opening, the second feed cone is permitted to be recharged by more seed from the hopper 17 and in this manner, it is insured that the feed cones of each of the pairs of feed cones are at all times full of seed. In this manner, as the first and second door plates are sequentially operated, a greater density of seed is deposited relative to a planting area.

The pairs of cams of the first and second cams 26 and 28 are arranged in a parallel relationship relative to one another but are rotatably displaced relative to one another relative to the axle 24. This displacement may be of any desired angular orientation relative to one another but for purposes of example, the first and second cam lobes 27 and 29 of the respective first and second cams are displaced substantially one hundred eighty degrees. As noted in FIG. 4, the first door plate 30 is operative through the first door plate actuator lever 34, while in a similar manner the second door plate 30a is operative through a second door plate actuator lever 34a arranged for engagement with the second cam lobe 29 of the second cam 28.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the U.S. is as follows:

1. A straight row planter comprising;

a support frame having a forward yoke including a first end, fixedly secured to a coupler and a second end, having a support beam fixedly secured within the support frame, the support frame rotatably mounting an axle parallel to the support beam, with the axle rotatably mounted within the support frame and having wheel members fixedly mounted to the axle, with the wheel members oriented exterior to the support frame, the support beam having a top wall and a bottom wall with a hopper secured to said top wall and at least one pair of feed cones comprising a first feed cone and a second feed cone attached to said bottom wall, said feed cones being in communication with the hopper wherein particulate material positioned within the hopper is arranged for reception within said feed cones, and door plate means secured to the support beam wherein the door plate means includes a first door plate and a second door plate, with the first door plate having a first spring hinge secured to the support beam, and the second door plate having a second spring hinge secured to the door plate, with the first feed cone and the second feed cone having a respective first exit opening and a second exit opening, with the first door plate in contiguous communication with the first feed cone extending over the first exit opening in a first position, with the first door plate displaced from the first exit opening in a second position and the second door plate arranged in contiguous communication with the second feed cone extending over the second exit opening in a first position, with the second door plate displaced relative to the second exit opening in a second position said door plate means effecting sequential displacement relative to the first feed cone and the second feed cone permitting sequential feeding through the first feed cone and the second feed cone.

2. A planter as set forth in claim 1 including a first cam fixedly secured to the axle and a second cam fixedly secured to the axle, where the axle is linear and the first cam and the second cam are substantially parallel relative to one another, with the first cam having a first cam lobe, the second cam having a second cam lobe, with the first cam lobe and the second cam lobe angularly displaced relative to one another, and the first door plate having a first actuator lever extending in adjacency to the first cam for cooperation with the first cam lobe, and the second door plate having a second actuator lever adjacent to the second cam for communication with the second cam lobe.

3. A planter as set forth in claim 2 wherein the first spring hinge biases the first door plate to the first door plate first position, and the second spring hinge biases the second door plate to the second door plate first position.

\* \* \* \* \*